June 2, 1925. Re. 16,090

B. W. KADEL

DRAFT RIGGING

Original Filed March 20, 1916 3 Sheets-Sheet 1

Inventor

Byers W. Kadel

By Ernest S. Mechlin his Attorney

June 2, 1925. Re. 16,090

B. W. KADEL

DRAFT RIGGING

Original Filed March 20, 1916 3 Sheets-Sheet 2

Inventor

Byron W. Kadel

By Frank L. Mechlin his Attorney

June 2, 1925. Re. 16,090
B. W. KADEL
DRAFT RIGGING
Original Filed March 20, 1916 3 Sheets-Sheet 3
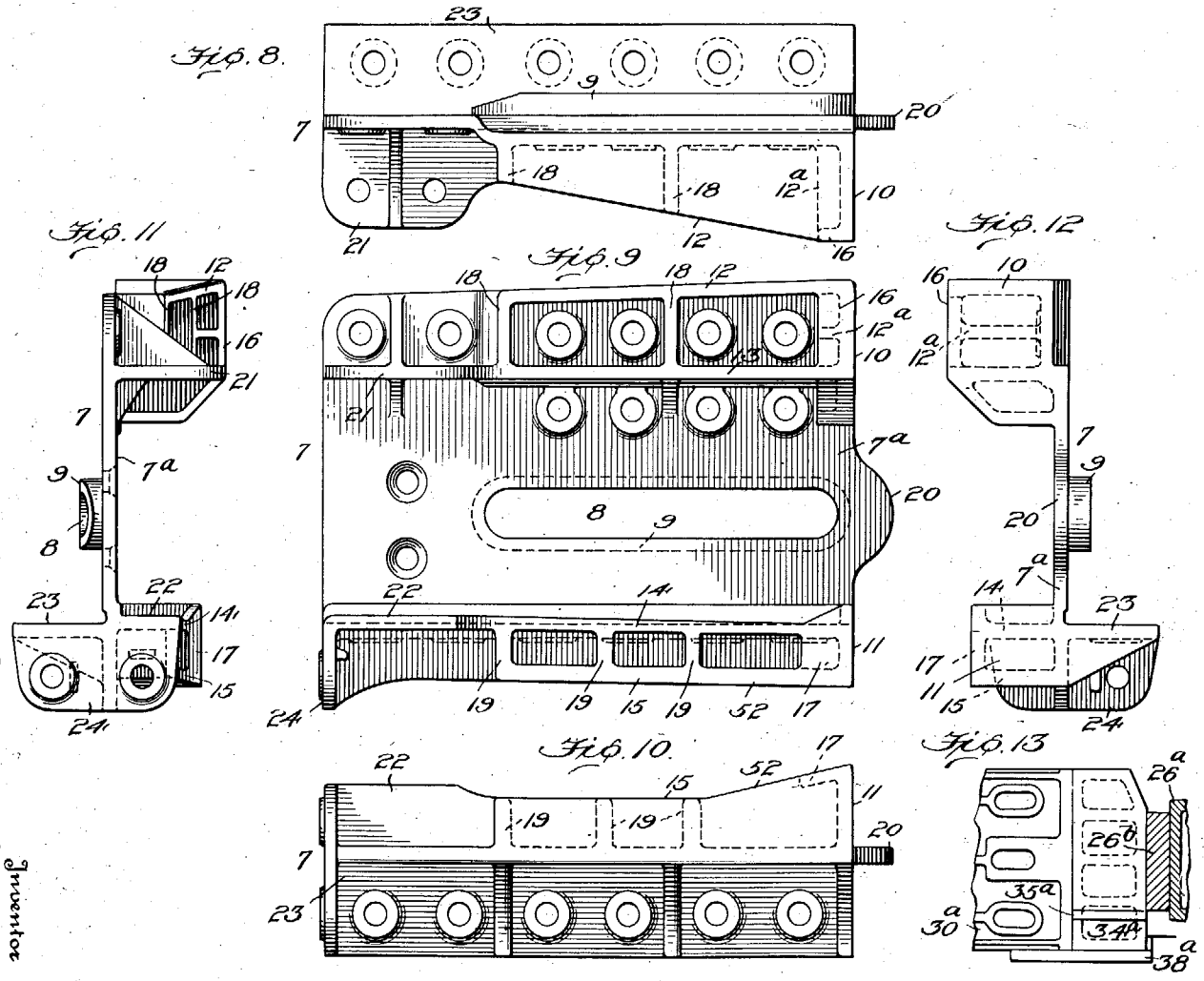
Inventor
Byers W. Kadel
By Frank P. Medlin
his Attorney Reissued June 2, 1925. Re. 16,090

UNITED STATES PATENT OFFICE.

BYERS W. KADEL, OF BALTIMORE, MARYLAND, ASSIGNOR, BY MESNE ASSIGNMENTS, TO THE SYMINGTON COMPANY, A CORPORATION OF MARYLAND.

DRAFT RIGGING.

Original No. 1,535,315, dated April 28, 1925, Serial No. 85,427, filed March 20, 1916. Renewed March 3, 1925. Application for reissue filed April 28, 1925. Serial No. 26,517.

*To all whom it may concern:*

Be it known that I, BYERS W. KADEL, a citizen of the United States of America, residing at Baltimore, in the State of Maryland, have invented certain new and useful Improvements in Draft Rigging, of which the following is a specification.

The invention relates to the art of draft rigging for railway cars, and more particularly to that class of draft rigging designed for application to the under frame of freight cars, and consists in providing in combination with an under frame, novel means to connect, hold and suitably brace the cushioning mechanism so as to produce a simple, strong, compact and reliable draft rigging.

To this end the main features of my invention, generally stated, consist in providing stop mechanism for the front follower of the cushioning mechanism, adapted to form a support, and means for attachment for the coupler guide, the coupler carry iron and the coupler limit stops, and to form in connection with the end sill braces stiffening members to suitably brace the center sills against lateral spreading.

There are other features of the invention as will appear from a more detailed description of the preferred embodiment thereof illustrated in the accompanying drawings, the scope of the invention being pointed out in the claims.

Throughout the specification and drawings like numerals designate like parts,

Figure 1:
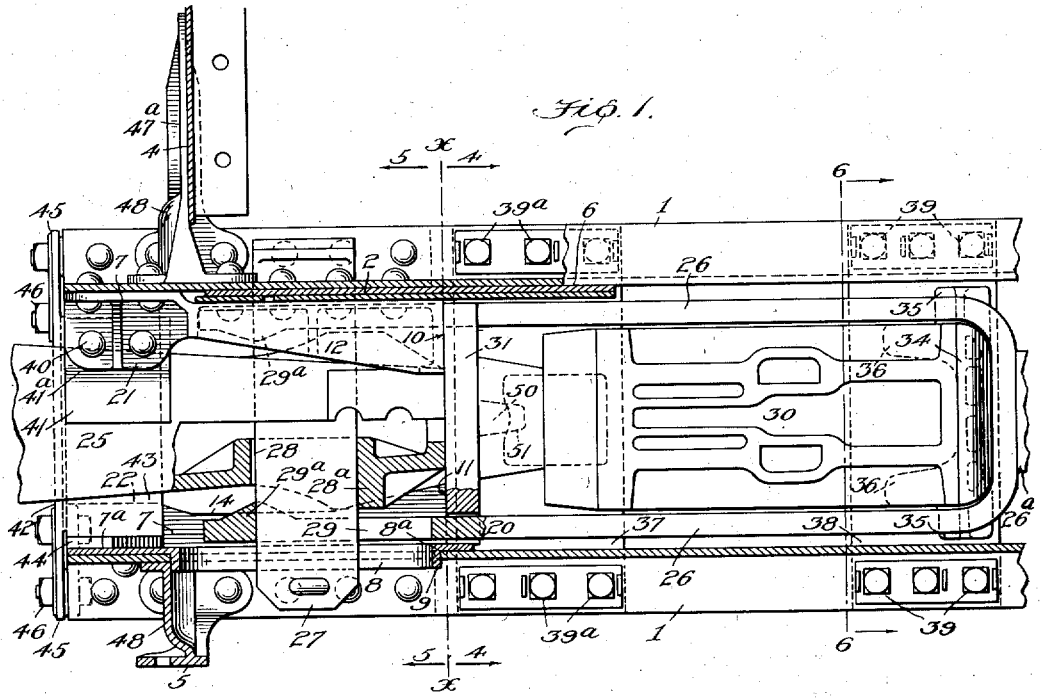
Figure 1 is a top plan view partially in section of draft gear devices embodying the invention.
Figure 4:
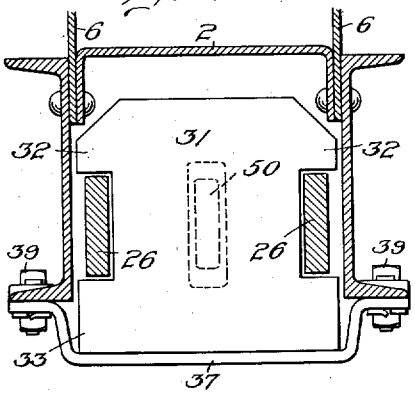
Figure 5:
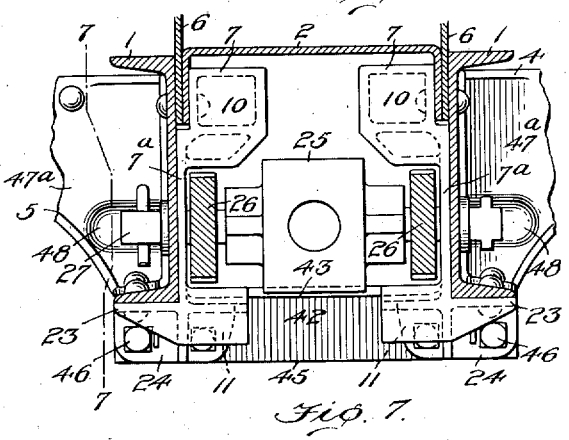

Figures 4 and 5 are detail sections taken on line X—X of Figure 1, looking in the direction indicated by the arrows designated 4—4 and 5—5, respectively.

Figure 6:
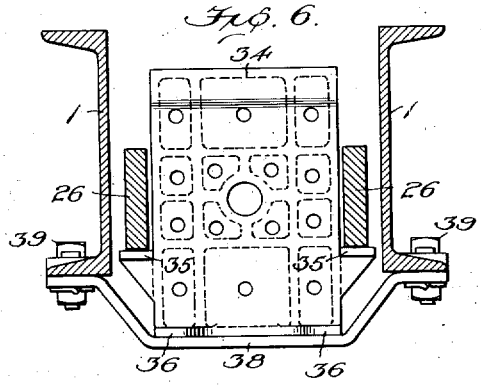

Figure 6 is a vertical cross-section on line 6—6 of Figure 1, a portion of the cushioning mechanism being omitted.

Figure 7:
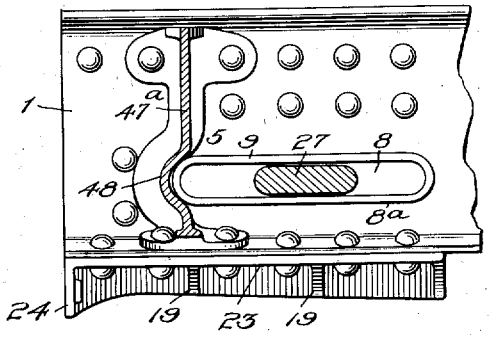

Figure 7 is a detail cross section on line 7—7 of Figure 5 showing one of the end sill braces.

Figures 8 to 12, inclusive, are details showing respectively a top plan, a side elevation, a bottom plan, and front and rear elevations of one of the cheek-plates or draw-bar stop castings, and Figure 13 is a fragmentary view partly in elevation and partly in vertical section showing a slightly modified construction of rear follower and cushioning mechanism.

Reference being had to the several illustrations and the reference numerals thereon, 1, 1 indicate the center sills, 2 the cover plate extending from sill to sill over the draft mechanism, 3 the end framing, 4 and 5 indicate the center or end sill braces, adapted to rigidly connect the center sills to the end framing, and 6 designates one of the braces for the end framing.

Connected to the inner face of each center sill and adjacent the end thereof are the cheek plates generally designated by the numeral 7, and since these cheek-plates are counterparts a description of one thereof will suffice. In Figures 8 to 12 of the drawings there is shown a cheek-plate 7 which is preferably provided with a longitudinally extending slot or opening 8, the outer edges thereof, for convenience, being provided with a reinforcing flange 9 adapted to extend through an opening $8^a$ in the center sills. Adjacent the inner end and at the upper and lower portions thereof the cheek-plate is provided with inwardly projecting stops or stop shoulders 10 and 11. The said stops are suitably spaced apart, so as to permit an arm of the coupler connecting means, hereinafter described, to pass between the said stops. Each of the said stops may be suitably braced; the upper stop 10 being reinforced by the horizontal ribs 12, $12^a$ and 13 formed on the web $7^a$ of the plate 7, and by the vertical web or flange 16. Likewise, the lower stop 11 is preferably reinforced by corresponding longitudinal ribs 14 and 15 and by a vertical web or flange 17. In order to further strengthen these stops and to stiffen the longitudinal ribs, the respective pairs of longitudinally extending ribs are preferably provided with one or more vertical reinforcing members such as shown at 18 and 19. As will be seen from Figure 9, the web 7ª may, intermediate the stop shoulders 10 and 11, be provided with a rearwardly extending portion 20 to increase the strength of the plate adjacent the inner end of the slot 8, thereby effecting a reduction in the length of the draft mechanism and a diminution in the weight of the cheek-plate without affecting the strength of the latter. This extended portion 20 is preferably centrally located with reference to the slot 8 formed in the cheek plate, and the maximum width of the said portion is less than the space separating the upper and lower stop members. The horizontal or longitudinally extending ribs 13 and 14, are, it will be noted, preferably extended to the forward end of the cheek plate 7 and adjacent the end of the plate are widened out as shown at 21 and 22 for purposes to be hereinafter described. The ribs 14 and 15 are reduced in width, as shown at 52, forwardly of the stop shoulder 11 for a purpose to be hereinafter disclosed. The center sills 1, 1 are preferably channel-beams having the flanges thereof outwardly directed, and the cheek-plate 7, in order to be securely connected to the adjacent center sill and to brace and stiffen the same, is preferably provided with an outwardly directed flange 23, adapted to underlie and to be secured to the lower flange of the said sill. A vertical flange or web 24 is provided at the lower outer end of the cheek-plate 7, as shown.

Figure 2:
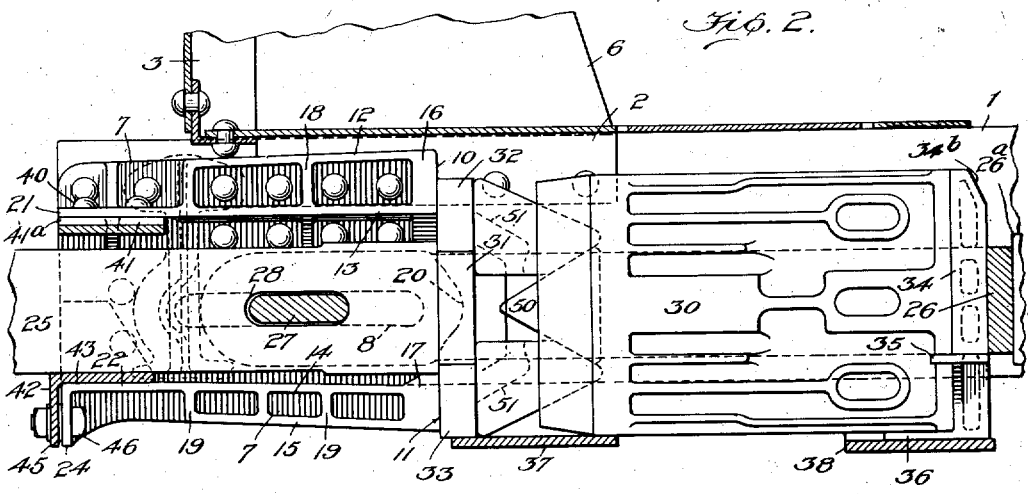
Figure 2 is a central longitudinal vertical section of the device illustrated in Figure 1, some of the movable parts being shown in elevation.
Figure 3:
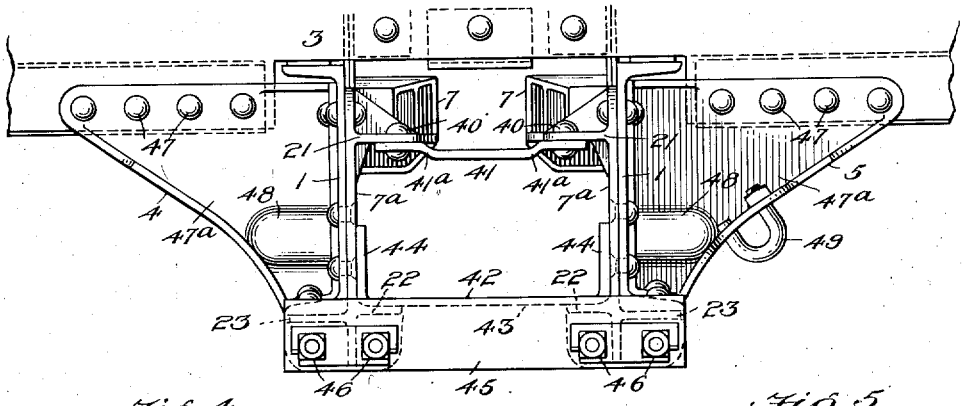
Figure 3 is an end elevation of the stationary portions of the device showing their relation to the car under frame.

Referring now to Figures 1 and 2, 25 designates the coupler which may be slidably connected to the yoke 26 by means of a key 27 which passes through alined slots 28 and 29 in the coupler and yoke, respectively, and through the slots 8 and 8ª in the cheek-plates and sills. The rearwardly extending portion of the slot 28 in the coupler is preferably reinforced by the outwardly extending wings or flanges 28ª and likewise there are formed on the inner or adjacent faces of the yoke arms 26, and adjacent the outer ends of the slots 29 therein, reinforcing means or inclined shoulders 29ª, 29ª. The outwardly extending wings 28ª on the coupler in the normal position of the same, overlie the rear ends of the flanges 14 and 15; the reduced portion 52 of the said flanges or ribs, hereinbefore described, is designed to permit the downward removal of the coupler independently of the yoke and cushioning mechanism. In order to remove the coupler the key 27 is removed and the coupler is drawn forwardly until the wings 28ª contact with the projections 29ª on the yoke, in which position the wings 28ª on the coupler will clear the reduced portion of the ribs or flanges 14 and 15 on the opposed cheek castings 7, thereby permitting the coupler to be dropped vertically. The cushioning mechanism, which is of a well known type of frictional resistance device, is generally designated by the numeral 30, and since it forms no part of the invention except in combination, need not be further described except as to its coaction with the front follower which will be set forth hereinafter.

The numeral 31 designates the front follower which is H-shaped as shown in Figure 4, and is provided with upper and lower arms 32 and 33, respectively, adapted to receive between them the arms of the yoke 26. The extended portion 20 of each cheek-plate 7 hereinbefore referred to, is preferably adapted to extend into the opening between the adjacent upper and lower arms 32 and 33, respectively, of the follower 31, thus enabling this reinforcing member to extend rearwardly of the front face of the follower without interfering with the proper seating of the same against the stop shoulders 10 and 11 by the interference of the edge of the follower with the edge of the lug.

To compensate for the reduction in area of the yoke arms, due to the slots 29 therein, without increasing the size of the yoke-receiving openings in the front follower, the yoke arms are preferably increased in width from the front face of the said follower forwardly, as shown in dotted lines in Figure 2, the widened portions of the yoke arms thus extending rearwardly to, or preferably somewhat inwardly of, the rear or inner ends of the slots 29.

The rear follower 34 is preferably provided with seats or shoulders, such as 35, adapted to contact with the lower faces of the rear end of the yoke or coupler connecting means 26, to thereby form a support for the same. The portion of the follower 34 above the projection 35 lies wholly between the planes of the yoke arms. The yoke 26 and the rear follower 34 are held from rearward movement by a centrally arranged back stop 26ª which normally contacts with the rear end of the said yoke. At the lower end, and preferably in line with the lower edge of the follower 34, there may be provided one or more projections, such for example, as 36, adapted to extend under and for means for alining the rear end of the frictional device 30 and the rear follower 34, said means also serving to provide an increased wearing surface for the said follower. The projections, or projection, as the case may be, are made slightly longer than the permissive travel of the coupler, and hence it will be evident that, even in case of the sticking of the frictional device, i. e., a failure to properly release from a compressive strain, the follower will always be maintained in a vertical position and so located with reference to the frictional device or other cushioning mechanism, that all danger of the follower jamming or failing to maintain its proper relation is entirely eliminated.

The projections 35 on the rear follower 34 support the yoke 26, and the follower 34 is in turn slidably supported by a plate 38 which is secured to the draft sills by means of the bolts 39. The plate 38 preferably extends under the rear follower and under the rear end of the cushioning mechanism and serves to support both of these elements and to permit their sliding movement in pulling. In Figure 13 there is shown a simplified arrangement of the construction for supporting the cushioning mechanism and rear follower. In this figure, $30^a$ designates the rear end of the cushioning mechanism, $34^a$ the rear follower, $35^a$ the projections on the rear follower which are adapted to support the yoke $26^b$, and $38^a$ designates the supporting plate which slidably engages the rear follower and the cushioning mechanism.

As will be noted, the follower $34^a$ is very much increased in thickness over the follower 34, as shown in the preferred form, and it is therefore unnecessary to provide alining means on the follower to hold the same in its proper position.

The follower 34, referring to the preferred form, is preferably provided with an inclined or bevelled portion $34^b$ to enable the follower to be entered between the cushioning mechanism and the yoke after the other parts of the cushioning mechanism have been assembled on the car and then to be driven into place in order to produce the necessary or desired initial compression.

An H-shaped front follower, such as is shown in Figure 4, cannot be lifted directly into place, but must be entered at an angle to the arms of the yoke and then given a quarter turn into its normal position. Hence in either assembling or disassembling a device such as is illustrated, it is necessary that the cushioning mechanism be removed from the yoke in order to disengage the H-shaped follower from between the arms thereof. As will be noted, the front follower 31 is provided with a boss or lug 50 which enters a suitable aperture 51 in the cooperating face of the cushioning mechanism to thereby hold the several parts in alinement. It is therefore necessary to provide a rear follower, such as 34, which may be removed vertically downward in order to provide sufficient clearance when the same is removed, to permit the cushioning mechanism to be moved rearwardly sufficiently to clear the projection 50 so that the same may be taken down, after which the follower 31 can be rotated sufficiently to disengage the projections thereof from the yoke arms.

The numeral 37 designates the front tie-plate or supporting plate which holds some of the moving parts of the device in their assembled relation. This plate is suitably connected to the lower flanges of the center sills 1, 1 by the bolts $39^a$.

The coupler guide 41 which preferably consists of a piece of comparatively light sheet-metal having vertical offsets $41^a$, $41^a$ therein is connected by means of the rivets 40 to the ribs 21 of the cheek plate 7. The principal function and purpose of this plate is to prevent the coupler from rising. It also acts as a coupler stop, but it is also made light enough to give way under a heavy blow in order to save the coupler head from damage should the coupler be forced rearwardly under an abnormal buffing strain. The offsets $41^a$, in addition to forming spaces to accommodate the lower heads of the rivets 40, serve to give some flexibility to this guide transversely of the car so that it will not act as a tie member between the cheek plates but will readily give under strains produced by a lateral movement of the coupler and will not tend to strain the cheek plate castings by imparting strains thereto incident to tie members, the braces 4 and 5, hereinafter more fully described, serving to hold the sill against lateral spreading. The lower ribs 22, 22 of the cheek plate 7 form a support for the combined carry-iron and coupler limit stop piece or device 42. This member, as will be noted, is preferably formed as an angle bar having one flange 43 placed horizontally and adapted to rest adjacent to its ends on the ribs or flanges 23, 23, the said flange 43 being preferably of a length to allow its insertion between the inner faces of the webs $7^a$ of the cheek plates. The flange 43 is provided at each end with an upwardly projecting portion 44 which, for example, may be preferably formed by cutting and bending the outer ends of the flange 43 upwardly and at right angles to said flange. The upwardly projecting members 44, 44 are adapted to serve as coupler limit stops, and to prevent the coupler from contacting with and wearing against the cheek plates. The vertical flange 45 of the member 42 is connected adjacent the ends thereof to the vertical flanges 24, 24 of the cheek plates 7 by means of bolts 46 passed through alined openings in the flange 45 and the flanges 24. These bolts 46 are, due to the engagement of the ends of the member 42 with the flanges 23, entirely relieved from all shearing strain and are only required to hold the carry-iron from forward movement.

The brace members 4 and 5, hereinbefore referred to, are adapted to be connected to the center sills in any approved manner in the plane of the end framing 3, and to be connected thereto by any suitable means, as, for example, by the use of the rivets 47. The vertical webs $47^a$ of these braces, at the points where they would intersect the slots 8ª in the sill, are preferably provided with curved portions 48 which extend around the ends of the slots so as to permit the key 27 to have full play in the slot 8ª. In connection with the sill brace 5, it is preferred to provide a pipe clamp, as for example, a headless U-bolt 49, to receive the air-brake pipe. This form of pipe-holding means provides both an economical and convenient means for connecting the brake-pipe to the car end in full accordance with the Master Car Builders' requirements governing the interchange of cars, which are in this regard that the end of the air-pipe must be located in the horizontal plane bisecting the coupler and thirteen inches off the center line of the car. The rivets which secure the braces 4 and 5 to the sills also pass through and connect the cheek plates thereto.

There are many advantages inherent in the invention hereinbefore described as will be apparent to those skilled in the art to which the same appertains, and it will not, it is believed, be out of place to point out some thereof in greater detail.

In assembling and removing draft mechanisms from car under frames, and particularly those mechanisms in which a horizontal yoke is applied, it is often necessary to remove coupler and yoke and owing to the lateral projection on these members shown clearly in Figure 1 adjacent the opposite edges of the key 27, it has heretofore been necessary to either spring apart the arms of the yoke so as to permit the removal of the coupler, or to remove the coupler limit stops to enable the yoke and drawbar to be taken out together. Limit stops of the kind heretofore used are connected to the car sills, generally by riveting, so that it becomes necessary, when it is desired to remove the yoke, to cut the rivets holding the stops in place since, as will also be observed from the drawings, these stops normally prevent the removal of the yoke. It will, therefore, be apparent, that by the use of a combined carry-iron and coupler limit stop device, such as is disclosed herein, it is possible, by the simple removal of four bolts, to take out the coupler and yoke, after the cushioning mechanism is removed. This easy removability greatly reduces the cost of labor on such replacements.

Having now described my invention in detail, although it is to be understood that the foregoing description and drawings are merely illustrative of one embodiment of my device, and that the terms used in this specification are to be taken in their descriptive and not their limiting sense, since what I claim and desire to secure by Letters Patent is:

1. In a draft rigging and in combination with the coupler, a horizontally disposed yoke, and cushioning mechanism therefor, of a follower, means for supporting the same, a projection on said follower, adapted to contact with said supporting means, said projection serving as means for alining the cushioning mechanism and the follower, and means on said follower for supporting the yoke.

2. In a draft rigging and in combination with a horizontally disposed yoke, of a follower having lateral projections thereon to support the yoke, the portion of the follower above the said projection being wholly included between the planes of the yoke arms.

3. In a draft rigging and in combination with a horizontally disposed yoke, a cushioning mechanism within the same, of a follower having intermediate its ends means to support the yoke, said follower also being provided with a projection adapted to underlie and form alining means for the cushioning mechanism.

4. In a draft rigging and in combination with the coupler, a horizontally disposed yoke and cushioning mechanism, of a follower, said follower having a projecting portion adapted to underlie the cushioning mechanism and also having projecting portions adapted to support the yoke, said follower being removable vertically from below independently of the yoke and cushioning mechanism.

5. In a draft rigging and in combination with the draft sills, coupler, horizontally disposed yoke, and cushioning mechanism, of a pair of followers, each of said followers being provided with lateral extensions to support the yoke, one of said followers having other projections adapted to overlie the yoke arms, the other of said followers being removable vertically independently of the yoke and cushioning mechanism.

6. In a draft rigging, draft sills, a coupler, a horizontally disposed yoke, a cushioning mechanism within the same, a removable carry iron, means formed on the carry-iron and adapted to extend into the plane of the arms of the said yoke, said means serving as stops to limit the swing of the coupler and being removable with the carry iron.

7. In a draft rigging, a coupler, a yoke connected thereto, an end framing, a pair of flanged draft sills having their webs vertical, cheek plates respectively connected to the webs of the said sills at their upper portions, said plates extending below the said sills and provided each with portions adapted to respectively project under and be connected to a flange of the corresponding sill, each of said plates being adapted at one end to extend forwardly beyond the end framing and provided at the opposite end with a pair of spaced stop shoulders between which the yoke is adapted to pass.

8. In a draft rigging and in combination with the draft sills, a coupler, a yoke and cushioning mechanism, of a pair of cheek plates connected to said sills, each of said plates being provided with an inwardly extending flange adjacent its forward end, said flanges serving as a support for the coupler carry iron, and a carry iron resting upon said flanges of the cheek plates.

9. In a draft rigging, the combination with center sills, of cheek plates connected to the inner faces of said sills, each of said cheek plates having an outwardly projecting follower engaging shoulder, longitudinally extending ribs formed on each cheek plate for bracing said shoulder, and a coupler guide plate extending between said cheek plates and above the coupler and connecting corresponding ribs of said cheek plates.

10. In a draft rigging for railway cars, the combination with center sills, of cheek plates connected to the inner faces of said sills, the forward portions of said cheek plates extending beyond the end framing of the car and being provided with longitudinally extending ribs, and a coupler guide plate connecting said ribs at a point beyond the end framing of the car.

11. In a draft rigging and in combination with the coupler and cushioning mechanism, of cheek plates, a carry iron secured to said cheek plates and adapted to support the forward end of said coupler, said carry iron having portions thereof adapted to extend upwardly between the sides of the coupler and the adjacent portions of the said cheek plates and to contact the latter, said portions serving as stops to limit the swing of the coupler.

12. In a draft rigging, the combination with spaced center sills, of cheek plates connected thereto, said cheek plates each being provided with an inwardly projecting flange, a car coupler positioned between said sills, and a removable carry iron bridging the space between said sills, said carry iron being adapted to overlie the flanges of said cheek plates and being furnished with upwardly projecting coupler limit stops which are attached to and removable with said carry iron, said stops, when said carry iron is in place, serving as means for decreasing the effective width of the space between said sills.

13. In a draft rigging, the combination with a coupler and its cushioning mechanism including a horizontally disposed yoke, of a car framing having therein an opening adapted to receive the shank of the car coupler, said opening being closed below by a detachable carry iron which is adapted to support the coupler, said carry iron having portions which overlap the sides of the shank of the coupler and projecting into the planes of the said yoke arms, said projections serving as limit stops for the coupler, and the effective width of the said coupler opening in the car framing being adapted to be increased by the detachment of said carry iron.

14. In a draft rigging, and in combination with the draft sills of a car framing, a coupler, cushioning mechanism therefor including a horizontally disposed yoke, of means for supporting the cushioning mechanism from the car framing, and a carry iron for supporting said coupler from the car framing, said carry iron having means projecting between said sills toward the center of the car for limiting lateral movement of the said coupler, said projecting means also extending into the path of removal of said yoke.

15. In a draft rigging, and in combination with slotted draft sills, slotted cheek plates, of a coupler, a horizontally arranged yoke, a key connecting the coupler and yoke, said key being adapted to pass through the slots in the sills and cheek plates, braces connected to said sills, each of said braces being provided with a rounded portion adjacent the slot in the corresponding sill, the ends of the said key being adapted to extend into said rounded portions of the said braces.

16. In a draft rigging, and in combination with slotted draft sills, of cheek plates connected to the inner faces thereof, each of said plates being provided with a slot registering with the slot in the adjacent sill, a coupler a yoke, a key connecting the coupler and yoke, said key passing through the said slots in the cheek plates and sills, a brace connected to the outer face of each sill adjacent the slot therein, said braces and the cheek plates cooperating to stiffen the draft sills, each of said braces being provided with a recess adapted to extend around the end of the slot in the adjacent sill, to thereby prevent the said key from contacting with the said braces.

17. In a draft rigging, the combination of a coupler, cushioning mechanism connected thereto by means of a horizontally disposed key, slotted draft sills, said key passing through the slots in said sills, and a brace connected to the outer face of each sill, a portion of the web of each brace extending rearwardly beyond the forward end of the slot in the adjacent sill.

18. In a draft rigging, the combination with the coupler, a horizontally disposed yoke, and cushioning mechanism, of a follower, projections on said follower adapted to support the said yoke, and transversely extending means passing under and slidably engaging the said follower and serving to support the cushioning mechanism.

19. In a draft rigging, the combination with the coupler, a horizontally disposed yoke and cushioning means, of a follower disposed between the said cushioning means and the said yoke, projections on said follower adapted to support the said yoke, and transversely extending means extending under the said follower and the cushioning means and constituting a support for the same.

20. In a draft rigging, the combination with the coupler, a horizontally disposed yoke, and cushioning mechanism therefor, of a pair of followers, one disposed at each end of the said cushioning mechanism, one of said followers and the cushioning mechanism having interengaging means, said follower being also provided with projections overlying the yoke arms, the other of the said followers being removable independently of the said cushioning mechanism to thereby permit the said cushioning mechanism and interengaging followers to be shifted out of engagement and independently removed.

21. In a draft rigging, the combination with the draft sills, a coupler, yoke and cushioning mechanism, of a pair of cheek plates connected to the said sills, said cheek plates having transverse vertical flanges at their ends, an angle bar carry iron bridging the space between the cheek plates, and securing means for said carry iron comprising bolts which pass through the vertical leg of the angle bar and the said vertical flanges of the cheek plates, the horizontal leg of the angle bar being adjacent the lower side of the coupler.

22. In a draft rigging, a pair of draft sills, cheek plates connected to the said sills and each provided with an inwardly projecting flange, and a coupler guide plate extending from cheek plate to cheek plate and secured to the flanges thereof, the said coupler guide having a vertical offset therein.

23. In a draft rigging, the combination with the car framing, a coupler, a yoke, and cushioning mechanism, of a removable member adapted to underlie the forward end of the said coupler, said member having portions thereof extending upwardly between the sides of the coupler and stationary parts of the car framing and adapted to contact the latter, said portions serving as stops to limit the swing of the coupler and being adapted to prevent the removal of the yoke when said member is in place.

24. In a draft rigging, a coupler, a horizontally disposed yoke, and cushioning means, in combination with slotted draft sills, slotted cheek plates secured thereto with the respective slots thereof in alinement, stop faces on said cheek plates with ways therein adapted to accommodate the adjacent yoke arms, the slots in the said cheek plates extending adjacent the said stop faces and the metal of each cheek plate being extended out around the slot therein beyond the plane of the stop faces, the width of the extended portion being within the limits of the yoke arm ways.

25. In a draft rigging, a car, draft sills, cheek plates secured to the opposing faces of said draft sills, a coupler having at the inner end horizontally extending portions disposed between the said cheek plates, the said cheek plates having horizontal ribs which underlie the said portions of the said coupler, a horizontally disposed yoke having the arms thereof disposed along each side of the coupler and having inwardly turned enlargements which extend into the plane of the end portions of the coupler, a key connecting the said coupler and yoke, the said ribs on the cheek plates being cut away to provide an opening therebetween to permit dropping the coupler when the said key has been removed and the coupler drawn forwardly out of its normal position.

26. In a draft rigging, a car, a pair of slotted draft sills, slotted stop castings secured to said draft sills and having stop faces with yoke ways therein, a follower abutting the said stop faces and having similar yoke ways therein, a slotted coupler, a slotted coupler yoke, a key extending through all of the said slots and connecting the said coupler and yoke together, the arms of the said yoke being enlarged adjacent the said slots therein and the said enlargements extending rearwardly of the slots in the yoke arms.

27. In a draft rigging, the combination with the draft sills and a horizontally arranged yoke, of cheek plates connected to the said sills, said cheek plates each being provided with horizontally extending portions above and below the yoke arms, said portions serving to guide the forward portions of the yoke, a carry iron bridging the space between the sills and provided with portions which extend upwardly between the sills into the path of movement of the yoke, and a downwardly removable supporting member for the rear end of the yoke, said yoke being removable horizontally from between the sills after the removal of the carry iron and the rear supporting member.

28. In a draft rigging, the combination with draft sills, of cheek plates connected thereto, a coupler, a horizontally disposed yoke, and a cushioning mechanism within the same, a removable member bridging the space between the sills and connected to the said cheek plates, and means rigidly connected to the said member, said means serving as stops to limit the swing of the coupler and being removable with the said member.

29. In a draft rigging, the combination with a coupler having a key receiving slot therein, of a yoke having slots therein, a key for connecting said coupler and yoke, said key extending through the said slots and lying in the plane of the yoke arms, and projections on the inner faces of the yoke arms adjacent the key slots thereof.

30. In a draft rigging, the combination with a pair of draft sills, of cheek plates connected to the inner faces of the said sills adjacent the ends thereof, said plates having projecting portions below the upper edges thereof, and a plate extending above the coupler and connected to the said projecting portions of said cheek plates, said connecting plate serving as a coupler guide.

31. In a draft rigging, the combination with center sills, of a cushioning mechanism positioned between the sills, said cushioning mechanism including a follower, a yoke surrounding said cushioning mechanism, front stop members adapted to transmit draft strains only, rear stops spaced from said front stop members and adapted to transmit buffing strains only, said front stop members being normally engaged by said follower and terminating substantially in the plane thereof, the forward face of said follower extending forwardly of the rear end of said front stop members.

32. In a draft rigging, the combination with a horizontally disposed yoke member and a cushioning mechanism therein, of a rear follower removable independently of said yoke and cushioning mechanism, said follower comprising a plurality of spaced walls, ribs extending between said walls, one wall of said follower having a flat face to engage a cushioning element, the other wall being curved at its edges to fit within the radii of the yoke.

33. In a draft rigging, the combination with a horizontally disposed yoke, a cushioning mechanism therein, of a follower removable independently of said yoke and cushioning mechanism, said follower comprising a plurality of spaced substantially rectangular walls, and a plurality of series of ribs for connecting the same, one of said series extending in an angular direction to another series, said follower walls being substantially equal in area.

34. In a draft rigging, draft sills, a coupler, a horizontally disposed yoke, a cushioning mechanism within the same, a removable coupler carry iron, means formed on the carry iron and extending into the plane of the arms of the said yoke, said means serving as stops to limit the swing of the coupler and being removable with the carry iron, a follower within the yoke and abutting the cushioning mechanism and being removable independently of the cushioning mechanism, the cushioning mechanism being removable only after the removal of said follower, and the yoke being removable only after the removal of the cushioning mechanism and the carry iron.

35. In a draft rigging, the combination with a slotted coupler, of a slotted yoke, means for connecting said yoke and coupler, said means comprising a key extending through said coupler and yoke, the walls of the said slots in the said coupler and yoke being arranged so as to transmit draft forces to said key as a direct compression.

36. In a draft rigging, the combination with a coupler, of a horizontally disposed yoke and a transversely extending connecting key, said yoke and coupler having laterally projecting portions which are adapted to overlappingly engage oppositely disposed portions of said key.

37. In a draft rigging, the combination with a coupler having a transversely extending key slot therein, of a horizontally disposed yoke having key receiving slots in the arms thereof, portions of the coupler adjacent the said slot being tapered outwardly and rearwardly to form an extended key bearing at the rear end of the slot, the said yoke arms being provided with inwardly projecting portions adjacent the forward edges of the slots therein, and a transversely extending key for connecting said coupler and yoke, portions of said key being in compression under draft strains.

38. In a draft rigging, the combination with draft sills, of cheek plates connected to the inner faces thereof, a coupler having a key slot therein, the rear wall of said key slot being outwardly extended by means of projections on the said coupler, a yoke with which said coupler is connected by means of a transversely extending key, said yoke being provided adjacent the front ends of the key slots with laterally extending portions, said key being adapted to extend through the coupler and yoke and through slots in said cheek plates, and means for preventing the yoke from moving longitudinally of the said key.

39. In a draft rigging, the combination with a pair of slotted draft sills, of slotted cheek plates connected thereto, a coupler, a yoke, cushioning means within the latter, a key for operatively connecting the said coupler and yoke, said key being adapted to pass through alined slots in said draft sills, cheek plates and yoke, projections formed on said coupler and yoke, said projections being adapted to engage oppositely disposed portions on said key to place the same under compression upon movement of the coupler in one direction.

40. In a draft rigging, the combination with spaced sills, of stop members connected to the inner faces of the sills adjacent the ends thereof, said members each being provided with a key receiving slot, said members having upright stop faces positioned in rear of the inner ends of said slots, a follower member normally adapted to engage said stop faces, portions of said first named members being adapted to extend rearwardly of said upright faces to reinforce the slots, said reinforcing portions being of less height than the follower member.

41. In a draft rigging, the combination with spaced sills, of stop members connected to the inner faces of the sills adjacent the ends thereof, said members each being provided with a key receiving slot and having upright stop faces positioned in rear of the inner ends of said slots, portions of said members adjacent the rear ends of said slots being curved and extended rearwardly of said upright faces to reinforce the slots.

42. In a draft rigging, the combination with spaced sills, of stop members connected to the inner faces of the sills adjacent the ends thereof, said members each being provided with a key receiving slot with curved ends and having upright stop faces positioned in the rear of the inner ends of said slots, portions of said members adjacent the rear ends of said slots being curved co-axially with the curved ends of the slots and extended rearwardly of the stop faces to reinforce the stop members to the rear of the slots.

43. In a draft rigging, the combination with spaced sills, of stop members connected to the inner faces of the sills adjacent the ends thereof, said members each being provided with a key receiving slot and having upright stop faces positioned in the rear of the inner ends of said slots, portions of said members forming the rear walls of the stop members adjacent the slots being extended rearwardly of the upright stop faces along a portion of the depth thereof and means at the forward ends of the members for connecting them to a striking member.

44. In a draft rigging, the combination with spaced sills, of stop members connected to the inner faces of the sills, said members each being provided with a key receiving slot and having substantially vertical stop faces positioned in the rear of the inner ends of said slots, portions of said members forming the rear walls of the stop members adjacent the slots being extended rearwardly of the upright stop faces along a portion of the depth thereof, portions of the stop members extending forwardly, and means connecting a coupler guiding portion to said forwardly extending portions.

45. A stop and cheek plate member for railway draft rigging comprising a longitudinal portion adapted for connection with a car sill, said portion being provided with a longitudinally disposed slot therein for the reception of a draft rigging key, and an upright stop face adjacent the rear end of said slot, said slot being formed by a flange adapted for cooperation with a corresponding aperture in an adjacent sill, portions of said member adjacent the flange at the rear of the slot being extended beyond the stop face to reinforce the slot.

46. A stop lug having a web portion, said lug being adapted to be secured to the inner face of a draft or center sill and provided with a follower engaging portion, said lug being provided with a slotted portion forwardly of said follower engaging portion, means for reinforcing the marginal edges of the slotted portion, said means being adapted to extend through a suitably formed slot in an adjacent sill, a portion of said lug being extended rearwardly of said slot into the vertical plane of said follower engaging portion and being of less width than said stop lug.

BYERS W. KADEL.